US012753644B2

(12) United States Patent
Inan et al.

(10) Patent No.: US 12,753,644 B2
(45) Date of Patent: Oct. 6, 2026

(54) MOTOR VEHICLE LOCK, IN PARTICULAR MOTOR VEHICLE DOOR LOCK

(71) Applicant: Kiekert Aktiengesellschaft, Heiligenhaus (DE)

(72) Inventors: Ömer Inan, Dorsten (DE); Michael Scholz, Essen (DE); Holger Schiffer, Meerbusch (DE); Peter Szegeny, Engelskirchen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 19/111,343

(22) PCT Filed: Sep. 1, 2023

(86) PCT No.: PCT/DE2023/100637
§ 371 (c)(1),
(2) Date: Mar. 13, 2025

(87) PCT Pub. No.: WO2024/061403
PCT Pub. Date: Mar. 28, 2024

(65) Prior Publication Data

US 2026/0085555 A1 Mar. 26, 2026

(30) Foreign Application Priority Data

Sep. 21, 2022 (DE) ..................... 10 2022 124 185.8

(51) Int. Cl.
*E05B 81/14* (2014.01)
*E05B 85/26* (2014.01)

(52) U.S. Cl.
CPC .................................... *E05B 85/26* (2013.01)

(58) Field of Classification Search
CPC .. E05B 85/26; E05B 2015/0496; E05B 81/44; E05B 81/50; E05B 81/14
See application file for complete search history.

(56) References Cited

U.S. PATENT DOCUMENTS 11,124,994 B2 9/2021 Jeong
11,572,717 B2 * 2/2023 Robert .................... E05B 81/46
2018/0112443 A1 4/2018 Scocco

FOREIGN PATENT DOCUMENTS

DE 10116621 A1 10/2001
DE 202010013611 U1 12/2011
(Continued)

OTHER PUBLICATIONS

International Search Report mailed Nov. 21, 2023, for International Application No. PCT/DE2023/100637.

*Primary Examiner* — Kristina R Fulton
*Assistant Examiner* — Thomas L Neubauer
(74) *Attorney, Agent, or Firm* — Renner, Otto, Boisselle & Sklar, LLP

(57) ABSTRACT

A motor vehicle lock, in particular a motor vehicle door lock, is equipped with a locking mechanism consisting substantially of a rotary latch and a pawl. Moreover, an actuating lever chain acting upon the locking mechanism is provided with a coupling lever. When engaged, the coupling lever ensures that the actuating lever chain is closed in order to actuate the locking mechanism and is open when disengaged. In order to change between these two stable end positions, the coupling lever engages by means of a pin into a slotted link of a positioning lever, which slotted link guides the pin. According to the invention, the slotted link is designed as a bidirectional slotted link in such a way that, when the coupling lever is acted upon, the pin reaches its first end position along a first path and, after the coupling lever has been acted upon again, reaches its second end position along a second path which is separate from the first path.

15 Claims, 10 Drawing Sheets

(56) References Cited

FOREIGN PATENT DOCUMENTS

| | | | | |
|---|---|---|---|---|
| DE | 102017105657 | A1 | 9/2018 | |
| DE | 102019127109 | A1 | 4/2021 | |
| DE | 102019133654 | A1 * | 6/2021 | ............ E05B 81/42 |
| DE | 102010035083 | B4 | 3/2023 | |

* cited by examiner

MOTOR VEHICLE LOCK, IN PARTICULAR MOTOR VEHICLE DOOR LOCK

This application is a national phase of International Application No. PCT/DE2023/100637 filed Sep. 1, 2023, which claims priority to German Application No. 10 2022 124 185.8 filed Sep. 21, 2022, each of which is hereby incorporated herein by reference in its entirety.

FIELD OF DISCLOSURE

The invention relates to a motor vehicle lock, in particular a motor vehicle door lock, having a locking mechanism consisting substantially of a rotary latch and a pawl, and having an actuating lever chain acting upon the locking mechanism and having a coupling lever, wherein the coupling lever, in the engaged state, closes the actuating lever chain to act upon the locking mechanism and opens it in the disengaged state, and wherein the coupling lever engages by means of a pin into a slotted link of a positioning lever, which slotted link guides the pin, in order to change between these two stable end positions.

BACKGROUND OF DISCLOSURE

Motor vehicle locks and in particular motor vehicle door locks of the conventional design according to the type explained above, as described for example in DE 10 2019 133 654 A1 of the applicant, have, for example, a coupling lever which is received in or on an actuating lever so as to be pivotable about an axis. For this purpose, the coupling lever has a control cam or slotted link into which the coupling lever can engage by means of a pin. Depending upon the position of the coupling lever or its pin within the slotted link, the actuating lever supporting the coupling lever can act upon a release lever and, by the actuating lever chain closed in this way, lift the pawl from its engagement with the rotary latch in the locking position of the locking mechanism. In this way, the associated motor vehicle lock or its locking mechanism is opened.

In addition to this engaged state of the coupling lever and the associated one stable end position, however, it is also possible that the coupling lever is pivoted relative to the actuating lever in such a way that the coupling lever cannot be brought into engagement with the release lever when the actuating lever is acted upon. In this case, the coupling lever assumes its disengaged state as a further second stable end position. The previously mentioned control cam or slotted link is provided in the prior art on a control lever.

In this way, the above-described teaching makes it possible to simultaneously lock the actuating lever and unlock the locking mechanism with the aid of an additionally provided electromotive drive unit. This has proven fundamentally successful. This gives the electromotive drive or the drive unit in question a dual function.

A comparable prior art, which also describes a generic motor vehicle lock, is the subject matter of DE 10 2019 127 109 A1. In this case, a coupling lever is again realized which undergoes guidance by means of a slotted link. For this purpose, the coupling lever has a pin which engages in the slotted link. The slotted link is provided in or on an adjusting lever. This means that the lever chain can be moved into a closing actuating position using an emergency actuating lever, with the aid of another realized electromotive drive.

The state of the art has proven itself in principle. However, due to the sometimes complex movement of the coupling lever with its pin inside the slotted link, disruptions or even malfunctions are possible. The invention as a whole seeks to remedy this.

SUMMARY OF DISCLOSURE

The invention is based upon the technical problem of further developing such a motor vehicle lock and in particular a motor vehicle door lock in such a way that the functional reliability is increased and malfunctions are avoided.

To solve this technical problem, the invention proposes, in a generic motor vehicle lock and in particular a motor vehicle door lock, that the slotted link realized on or in the positioning lever be designed as a bidirectional slotted link in such a way that, when the coupling lever is acted upon, the pin reaches its first end position along a first path and, after the coupling lever has been acted upon again, reaches its second end position along a second path which is separate from the first path.

The two end positions, i.e., the first end position and the second end position, correspond to the engaged or disengaged state of the coupling lever. Both end positions are assumed in a stable manner. Due to the different ways of assuming the respective end position, possible malfunctions are avoided in principle, in contrast to the prior art.

This can essentially be attributed to the fact that the slotted link or the bidirectional slotted link ultimately functions and works according to what is known as the ballpoint pen principle. A one-time or initial actuation of the coupling lever results in the coupling lever or its pin assuming its first end positions along the first path. In the case of a ballpoint pen, this corresponds to pressing the mechanism once and then clicking it into place. According to the invention, the repeated application of the coupling lever (advantageously in the same actuation direction) now leads to the pin of the coupling lever reaching and assuming the second end position along the second path, which runs separately from the first path. In the case of a ballpoint pen, this corresponds to repeatedly pressing and releasing the locking mechanism described above. What is crucial in this connection and according to the invention is that the first path and the second path are spatially and functionally separated from one another, such that both the first end position and the second end position are each assumed safely and stably, and any disruptions or indifferent functional states cannot occur in principle and are observed according to the invention.

In order to realize and implement this in detail, the design is further such that the bidirectional slotted link has at least one separation stop separating the two paths from each other. Usually, two separation stops are implemented. In addition to the separation stop, an evasive stop is also provided. The interaction between the evasive stop and the separation stop ensures here that the first path and the second path are spatially and functionally separated from each other and, for the rest, that the first end positions and the second end position are each assumed stably and without mutual influence. As already explained, for this purpose and advantageously, two separation stops and the one evasive stop are provided according to the invention inside the slotted link.

The positioning lever that supports the slotted link is in turn equipped with a center-zero spring. In this connection, the center-zero spring ensures that the slotted link or the positioning lever has and assumes a basic position from which pivoting movements of the positioning lever and thus also pivoting movements of the slotted link carried by the positioning take place against spring force, and the center-zero spring ensures a return starting from this basic position. The center-zero spring can advantageously be designed as a leg spring arranged on a bearing pin of the positioning lever, with a winding portion and two legs extending therefrom. In most cases, the winding portion encloses the bearing pin, and the two legs are arranged on the edge of the positioning lever or act thereupon.

In addition, the usual procedure is to assign a return spring to the coupling lever. The return spring ensures that the coupling lever is, like the slotted link, preloaded or reset in the direction of a basic position assumed by the coupling lever and the slotted link. In order to move the coupling lever, the force of the return spring associated with the coupling lever must be overcome.

In detail, the coupling lever is equipped with at least two arms, with a pin arm, carrying the pin, and additionally with a coupling arm. The coupling arm can be used to close the actuating lever chain when the coupling lever is in the engaged state and to open it when the coupling lever is in the disengaged state. For this purpose, the coupling lever can be mounted on an actuating lever and, in the engaged state, when the actuating lever is actuated, it can entrain a release lever which in turn lifts the pawl from its locking engagement with the rotary latch. In contrast, the disengaged state of the coupling lever corresponds to the fact that an actuation of the actuating lever with the coupling lever mounted thereon has no effect on the release lever, such that the actuating lever chain is mechanically interrupted in this case, and the locking mechanism consisting of the rotary latch and pawl in the closed state cannot be opened.

The coupling arm already described above, which in the example ensures the mechanical connection of the actuating lever to the release lever, and the pin arm, carrying the pin, of the coupling lever are typically arranged at a distance from one another and, in particular, at an angular distance from one another. In fact, it has proven effective if the coupling arm and the pin arm are mounted rotatably about a common axis. In most cases, the coupling lever is also equipped with an actuating arm. The actuating arm, the pin arm, and the coupling arm have a common axis for the rotation of the coupling lever. The coupling lever can be actuated via the actuating arm. This allows the coupling lever, as described, to be guided between the two stable end positions with its pin inside the guide rail.

The actuation of the coupling lever via its actuating arm can be realized and implemented in any way. For example, it is conceivable that the coupling lever be actuated manually via the actuating arm. Here, direct manual actuation has proven advantageous. It is also conceivable that the actuating arm be actuated directly or indirectly—for example, via a locking cylinder. As a rule, however, the coupling lever is actuated via the coupling arm using an electromotive drive. The electromotive drive can perform multiple functions, such that it can be used not only to engage and disengage the coupling lever, but also for electromotive opening.

Functional positions such as "unlocked" in the engaged state and "secured" in the disengaged state can correspond to an associated safety device. In the unlocked position of the safety device, the engaged coupling lever ensures that the actuating lever mechanism is mechanically closed and, consequently, a, for example, manual actuation of the actuating lever mechanism via an outside or inside door handle leads to the locking mechanism being opened. By contrast, the secured position of the safety device and the consequent disengaged position of the coupling lever relative to the actuating lever chain belongs to the scenario that a manual actuation of the inside door handle or the outside door handle relative to the locking mechanism has no effect.

In addition to this function of the electromotive drive as a component of the safety device, it is possible in the context of the invention that, due to the realized slotted link control of the coupling lever, the electromotive drive can in principle also open the locking mechanism in question electromotively, as is described in detail in the generic prior art according to DE 10 2019 133 654 A1. Either way, the design according to the invention of the slotted link as a bidirectional slotted link with the first path and the second path, which is separate from the first path, and the two stable end positions achieved thereby ensures a particularly functional structure which, simultaneously, prevents any malfunctions. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
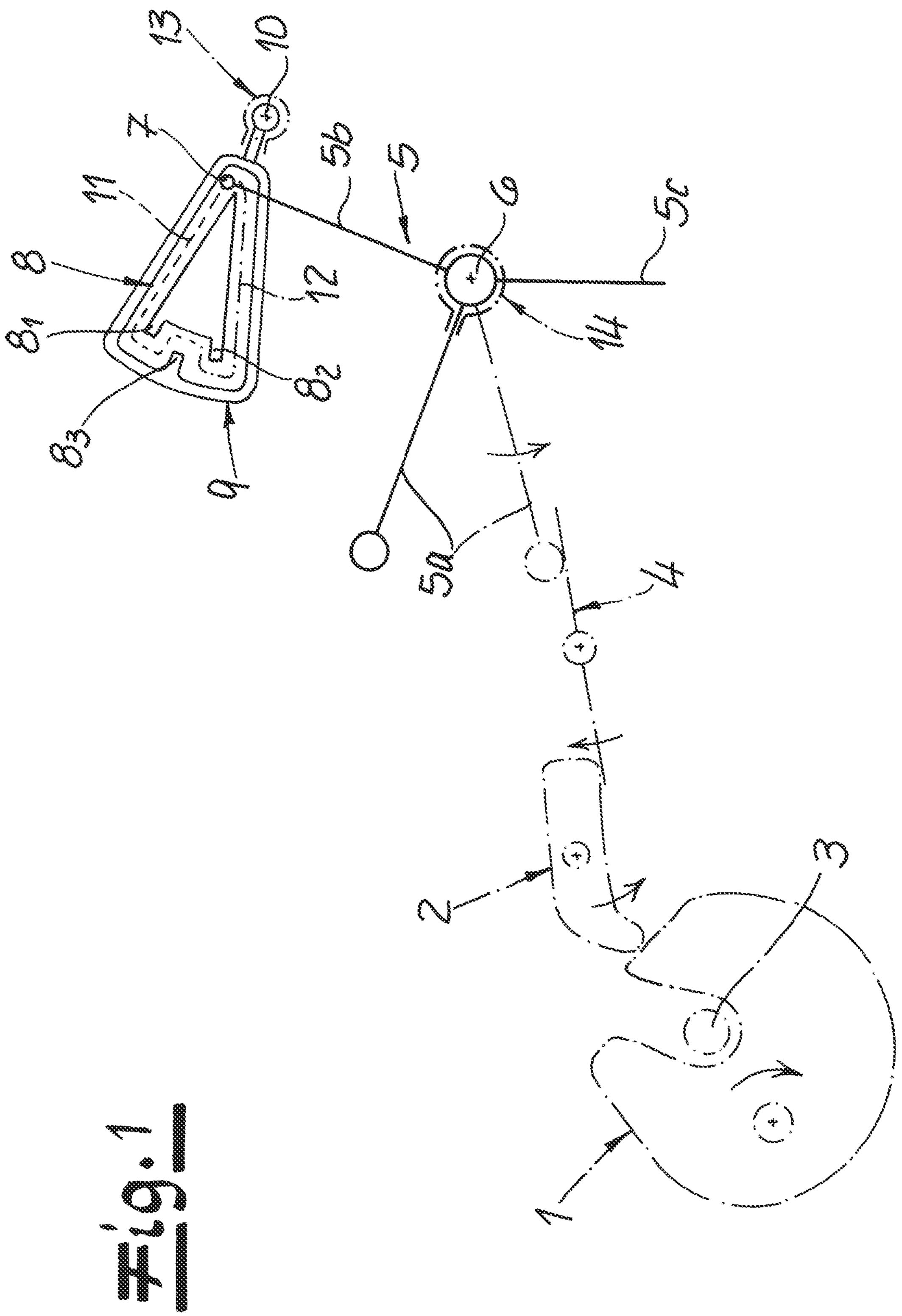
FIG. 1 to 6 show the motor vehicle lock according to the invention during the transition of the coupling lever from its basic position shown in FIG. 1 to the first end position in the representation according to FIG. 6 along a first path.

In the figures, a motor vehicle lock is shown, which is a motor vehicle door lock. This is reduced to its essential elements for the invention. The motor vehicle lock or motor vehicle door lock in fact has a locking mechanism 1, 2, consisting of a rotary latch 1 and a pawl 2, which is merely indicated in FIG. 1. In addition, a locking bolt 3 can be seen, caught by the rotary latch 1, as well as a release lever 4 and a coupling lever 5.

The release lever 4 and the coupling lever 5 together define an actuating lever chain 4, 5 which can be used to open the locking mechanism 1, 2 shown in FIG. 1. According to the exemplary embodiment, an opening movement of the locking mechanism 1, 2 shown in the closed state in FIG. 1 corresponds to the fact that the coupling lever 5 is not only in its engaged state shown in dash-dotted lines in FIG. 1, but also performs a pivoting movement in a counterclockwise direction about its axis 6, which is also indicated in FIG. 1. For this purpose, the coupling lever 5 can be mounted on an actuating lever not shown in detail.

The engaged state of the coupling lever 5, as shown in FIG. 1 with dash-dotted lines, during a pivoting movement of the actuating lever and thus also of the coupling lever 5 about its axis 6 or also about another axis as indicated in FIG. 1, now results in the coupling lever 5 actuating and being able to actuate, by means of its coupling arm **5*a*, the release lever 4, which release lever in turn actuates the pawl 2. As a result, the pawl 2 in the example case according to FIG. 1 pivots about its axis in a counterclockwise direction and releases the rotary latch 1, which was previously locked together with the pawl 2 in the closed position of the locking mechanism 1, 2. The rotary latch 1 can then swing open in the clockwise direction indicated in FIG. 1 and in turn releases the locking bolt 3**, and thus an associated motor vehicle door. Of course, this is only exemplary and purely schematic.

In any case, the overall design is such that the actuating lever chain 4, 5 working on the locking mechanism 1, 2 is equipped with the previously mentioned coupling lever 5. In its engaged state shown in dash-dotted lines in FIG. 1, the coupling lever 5 ensures that the actuating lever chain 4, 5 is closed so as to act upon the locking mechanism 1, 2. By contrast, the disengaged state of the coupling lever 5 shown in solid lines in FIG. 1 and assumed in FIG. 1 means that the actuating lever chain 4, 5 is open.

Figure 6:
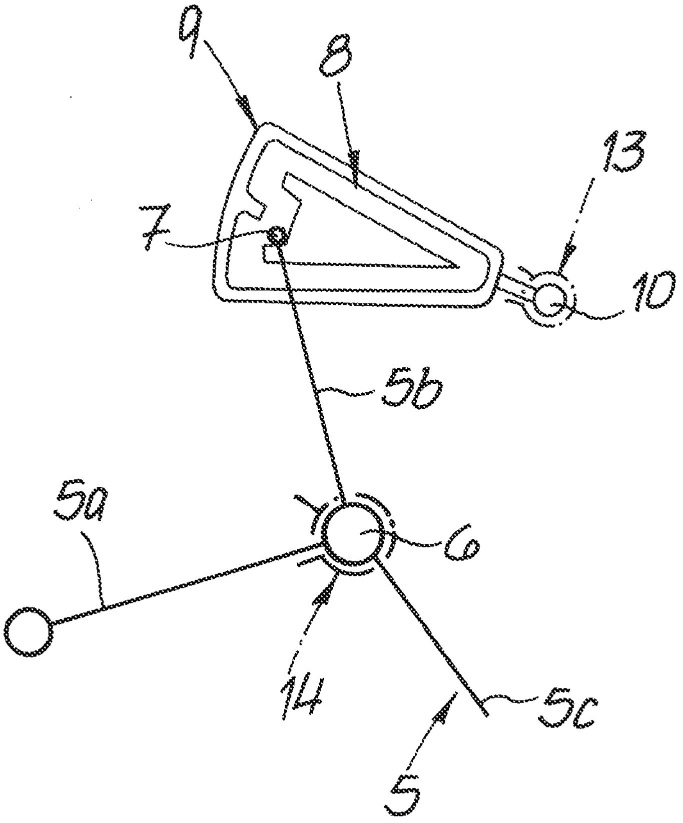

So that the coupling lever 5 can now be safely moved back and forth between the two previously described, stable end positions, viz., the disengaged state shown in FIG. 1 or the basic position shown here and the engaged position of the coupling lever 5 according to the functional position in FIG. 6, and no malfunctions are observed, the coupling lever 5 engages by means of a pin 7 into a slotted link 8 that guides said coupling lever, i.e., the coupling lever 5, in order to change between these two stable end positions. In this case, the slotted link 8 is provided on a positioning lever 9. The positioning lever 9 is shown only schematically and can be pivoted about an axis 10 according to the exemplary embodiment. The positioning lever 9 may be an adjusting lever, as is also provided in comparable motor vehicle locks and in particular in the generic prior art according to DE 10 2019 133 654 A1.

Figure 10:
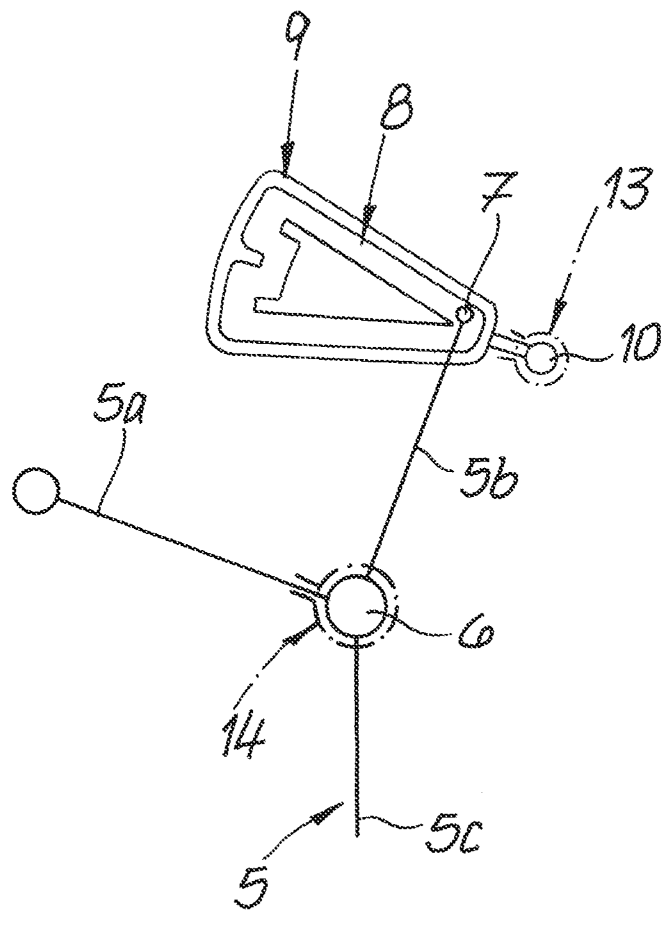

The previously described and referred to slotted link 8 on or in the positioning lever 9 is designed as a bidirectional slotted link 8 according to the exemplary embodiment. In fact, the pin 7 on the coupling lever 5 can cover an overall first path 11 within the slotted link 8 until the first end positions of the pin 7 are reached in the functional position according to FIG. 6. In addition, the pin 7 is able to complete a second path 12, starting from the first end position corresponding to the representation in FIG. 6 up to the second end position, as shown in FIG. 10, and in the same way in the basic position according to FIG. 1. In the context of the exemplary embodiment, the second end position according to FIG. 1 or 10 may belong to the "secured" position of a safety device, which accordingly corresponds to the "disengaged" state of the coupling lever 5. By contrast, the first end position in the functional position according to FIG. 6 represents the "unlocked" state of the safety device and, accordingly, the "engaged" state of the coupling lever 5. The safety device may be a locking device, a child safety device, an anti-theft device, or even combinations.

It can be seen that the slotted link 8 is not only designed as a bidirectional slotted link 8, but is also designed such that, by acting upon the coupling lever 5, the pin 7 reaches the first end position in FIG. 6 along its first path 11 and, after again acting upon the coupling lever 5 (in the same actuating direction), it moves along the second path 12, which is separate from the first path, to the second end position corresponding to the representation in FIG. 10 or 1. Both paths 11 and 12 are spatially and functionally separated from each other.

This can be attributed to the fact that the slotted link 8 functions according to the ballpoint pen principle already described in the introduction. This is because the one-time and initial actuation of the coupling lever 5 starting from the functional position in FIG. 1 or corresponding to the second end position results in the pin 7 moving into the first end position according to FIG. 6 and being locked or held there, as it were. For this purpose, the bidirectional slotted link 8 is equipped with a separation stop $\mathbf{8}_1$ separating the two paths 11, 12 from each other. According to the exemplary embodiment, two separation stops $\mathbf{8}_1$, $\mathbf{8}_2$ are provided. In addition to the two separation stops $\mathbf{8}_1$, $\mathbf{8}_2$, an evasive stop $\mathbf{8}_3$ can also be seen.

The two separation stops $\mathbf{8}_1$, $\mathbf{8}_2$ are located here on both sides of the evasive stop $\mathbf{8}_3$, which is provided opposite a recess formed between the two separation stops $\mathbf{8}_1$, $\mathbf{8}_2$, into which recess the pin 7 dips at the end of the first path 11 and, in the first end position according to FIG. 6, is held in contact with the separation stop $\mathbf{8}_2$.

The positioning lever 9 is equipped with a merely indicated center-zero spring 13, which, according to the exemplary embodiment, can be designed as a leg spring which, with its winding portion, encloses a bearing pin defining the axis 10 and has two legs extending from the winding portion. The coupling lever 5 is in turn equipped with a return spring 14 which ensures that the coupling lever 5 is transferred to its basic position shown in FIGS. 1 and 10 or the second stable end position ("secured" position of the safety device and "disengaged" position of the coupling lever 5).

Finally, it can be seen that the coupling lever 5 is equipped with a pin arm **5*b* supporting the pin 7, in addition to the coupling arm 5*a* already mentioned. In addition, an actuating arm 5*c* is usually provided. The three previously mentioned arms 5*a*, 5*b*, and 5*c* of the coupling lever 5 are rotatably connected to the common axis 6. Furthermore, it can be seen from the exemplary embodiment that the three arms 5*a*, 5*b*, and 5*c* each define the coupling lever 5** at an (angular) distance from one another.

Figure 2:
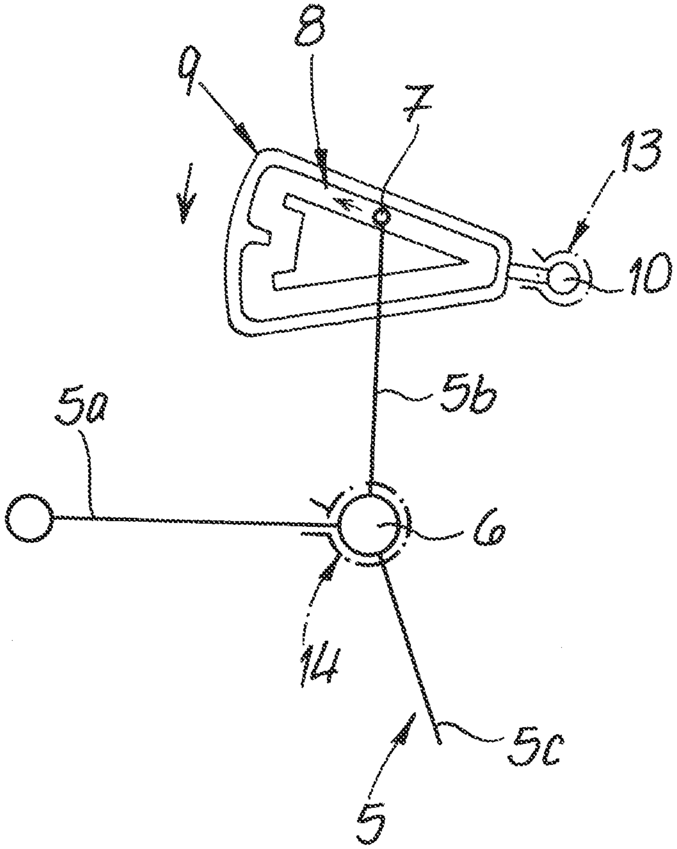
Figure 3:
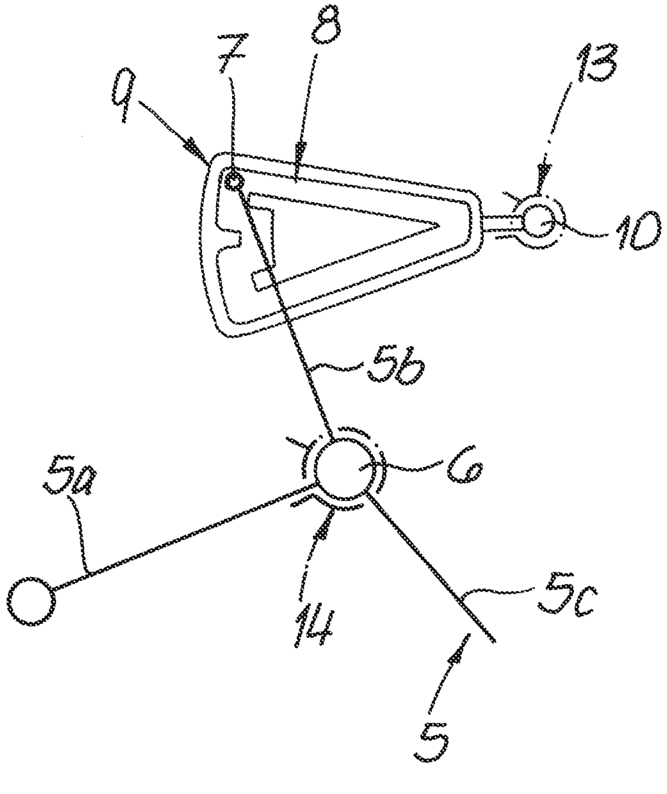

The mode of operation is as follows. Starting from the second end positions or basic position of the coupling lever 5 in FIG. 1 or 10 ("secured" or "disengaged"), an actuation of the coupling lever 5 or its actuating arm in the counterclockwise direction relative to the axis 6 results in the pin 7, starting from the second end position or basic position in FIG. 1, describing the first path 11 within the slotted link 8. This can be seen in the transition from FIG. 1 to FIG. 2. The return spring 14 acting upon the coupling lever 5 is acted upon and tensioned. At the same time, during its movement along the first path 11 within the slotted link 8, the pin 7 ensures that the positioning lever 9 carrying the slotted link 8 is pivoted slightly about its axis 10 in a counterclockwise direction during the transition from FIG. 1 to FIG. 2. The pin 7 on the pin arm **5*b* of the coupling lever 5 now moves along the first path 11 until the pin 7 within the slotted link 8 reaches the end position shown in FIG. 3. The coupling lever 5 is now deflected to the maximum extent about its axis 6 and ultimately reaches the "engaged" position shown in dash-dotted lines in FIG. 1. During the further movement of the pin 7 within the slotted link 8 during the transition from FIG. 3 to FIG. 4, the center-zero spring 13 acting upon the positioning lever 9 ensures that the positioning lever 9, and thus also the slotted link 8, are reset. This is because, during the transition from FIG. 1 to FIG. 2 and further to FIG. 3, the positioning lever 9 together with the slotted link 8 has been pivoted counterclockwise about the axis 10 such that the center-zero spring 13 has been deflected. After reaching the functional position in FIG. 3, the center-zero spring 13 ensures that the positioning lever 9 and with it the slotted link 8 are returned in a counterclockwise direction, as can be seen from a transition from FIG. 3 to FIG. 4. Now, the pin 7** lies against the evasive stop $\mathbf{8}_3$.

Figure 4:
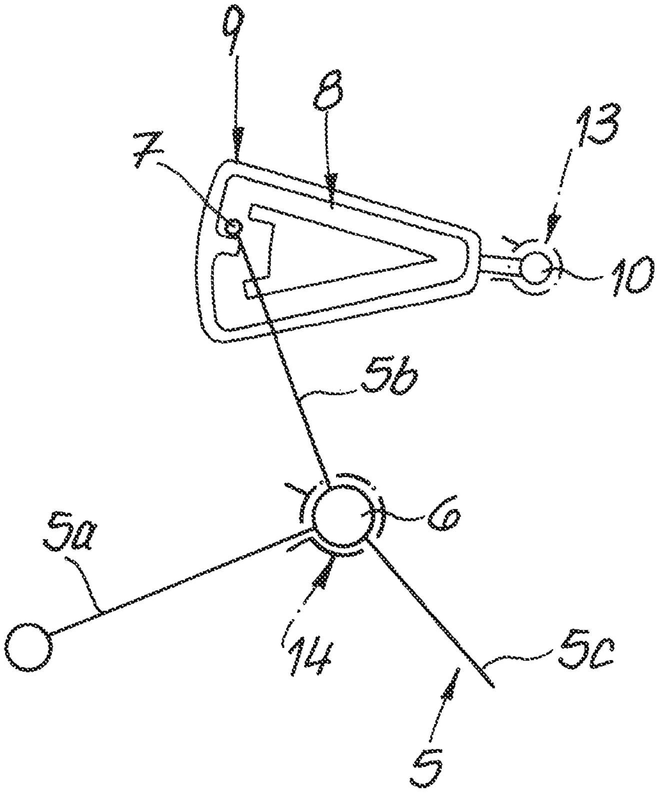
Figure 5:
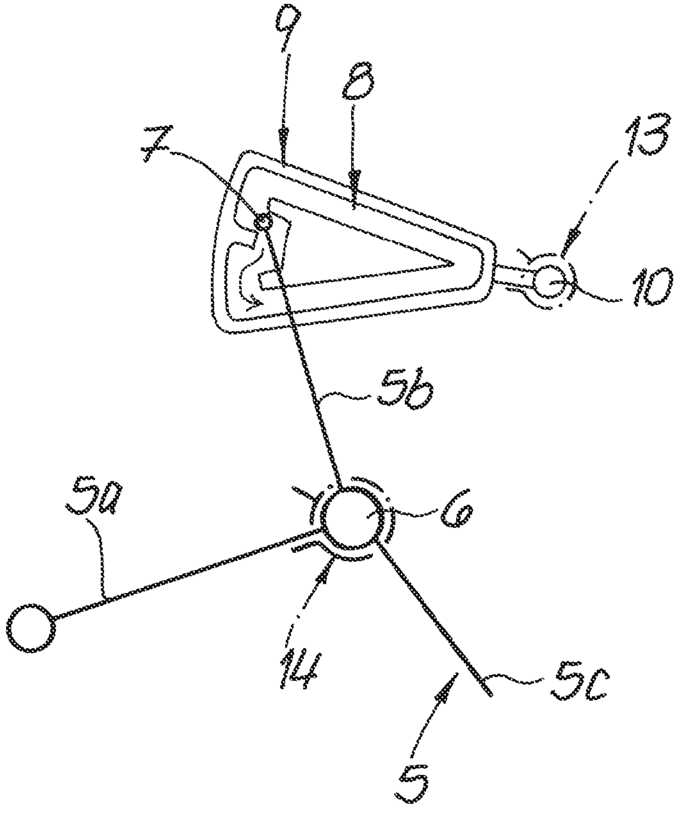

As a result, the return spring 14 acting upon the coupling lever 5 can return the coupling lever 5 clockwise during the transition from FIG. 4 to FIG. 5 far enough that the pin 7 comes to rest at the recess between the two separation stops $8_1$ and $8_2$. This is shown in FIG. 5. During the further transition from FIG. 5 to FIG. 6, the center-zero spring 13 again ensures that the positioning lever 9 and with it the slotted link 8 are acted upon clockwise about the axis 10 in the direction of the basic position of the positioning lever 9 and the slotted link 8 as shown in FIG. 1, such that, as a result of this, ultimately, and at the end of the first path 11, the pin 7 reaches the first end position as shown in FIG. 6. This end position in FIG. 6 is assumed in a stable manner because the positioning lever 9 and with it the slotted link 8 are (slightly) preloaded clockwise with respect to the axis 10 by means of the center-zero spring 13.

Figure 7:
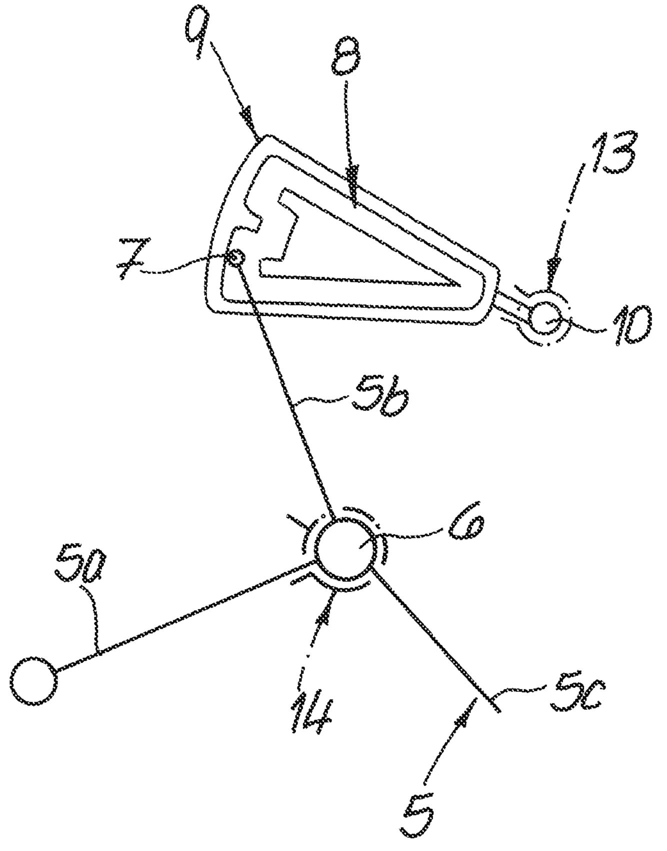
FIG. 7 to 10 show the travel path of the coupling lever starting from the first end position according to FIG. 6 along the second path up to its second stable end position in the representation according to FIG. 10, which coincides with the basic position according to FIG. 1.

In order to be able to move from this stable first end position of the pin 7 in the slotted link 8 and thus of the coupling lever 5 in the "engaged" position according to FIG. 6 or "unlocked" of the safety device again to the second end position according to the functional position according to FIG. 10 or 1, it is necessary that the coupling lever 5 be actuated again so that the pin 7 can complete the second path 12 separately from the first path 11 until it reaches the second end position in the representation according to FIG. 10. This process can be seen in the transition from FIG. 6 to FIG. 7. In fact, the actuation of the coupling lever 5 in this case corresponds to the coupling lever 5 being acted upon again about its axis 6 in a counterclockwise direction.

For this purpose, the associated actuating arm 5*c* may be actuated manually or also by an electromotive drive, as explained in the introduction to the description. This means that, comparably to the ballpoint pen principle already described above, a renewed actuation of the coupling lever 5 in the same direction ensures that the previously achieved locking or the reaching of the first end position in the representation according to FIG. 6, after the pin 7 has completed the first path 11, is canceled, and also is able to be canceled. The actuation of the coupling lever 5 on its actuating arm 5*c* in a counterclockwise direction about its axis 6 during the transition from FIG. 6 to FIG. 7 now results in the pin 7 being able to leave the lower separation stop $8_2$. As a result, the center-zero spring 13 is able to act upon the positioning lever 9 about its axis 10 in a counterclockwise direction, such that the pin 7 changes from the functional position according to FIG. 7 to the position according to FIG. 8.

Figure 8:
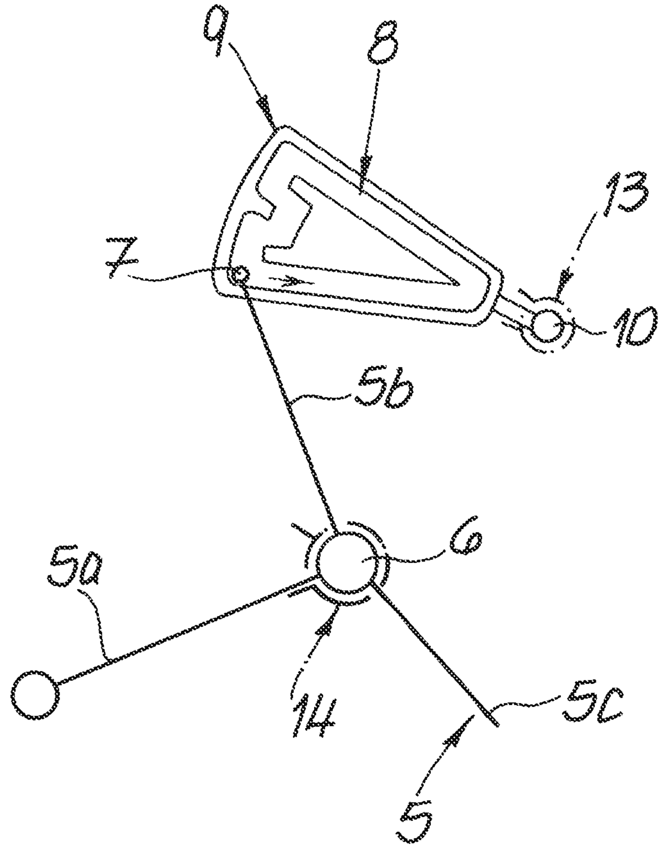

Starting from the functional position in FIG. 8 on the part of the pin 7, the return spring 14 acting upon the coupling lever 5 now ensures that the coupling lever 5 is pivoted about its axis 6 in a clockwise direction and is thereby moved along the second path 12 in the direction of its second end position corresponding to the representation in FIGS. 10 and 1. This can be seen in the transition from FIG. 8 to FIG. 9. During this process, the return spring 14 acting upon the coupling lever 5 does not just ensure that the coupling lever 5 is pivoted clockwise about its axis 6. The pin 7 moved along the second path 12 at the end of the pin arm 5*b* of the coupling lever 5 also pivots the positioning lever 9 and with it the slotted link 8 about the axis 10 in a clockwise direction beyond the basic position shown in FIG. 1, as can be seen in the transition from FIG. 8 to FIG. 9.

Figure 9:
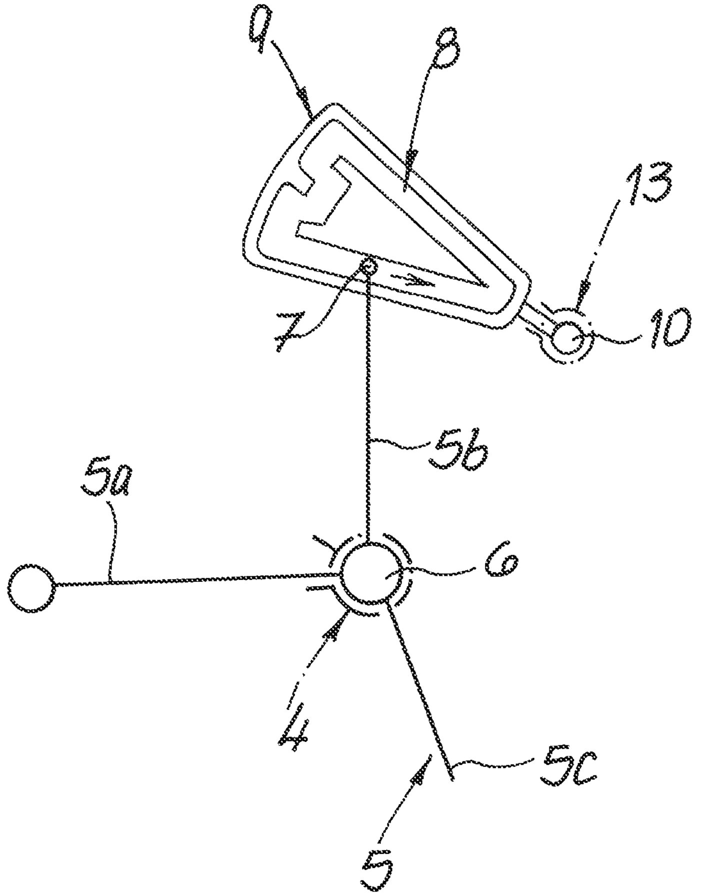

As soon as the pin 7 has reached a free region at the end of the second path 12, the positioning lever 9 can be reset again by means of the center-zero spring 13, which corresponds to the positioning lever 9, and with it the slotted link 8, pivoting counterclockwise about the associated axis 10, as is evident in the transition from FIG. 9 to FIG. 10. Now, the coupling lever 5 or the coupling arm 5*a* has reached its second end position corresponding to the basic position in FIG. 1, as also shown at the end of the second path 12 in FIG. 10.

LIST OF REFERENCE SIGNS rotary latch 1
pawl 2
locking mechanism 1, 2
locking bolt 3
release lever 4
coupling lever 5
actuating lever chain 4, 5
coupling arm 5*a*
pin arm 5*b*
arms 5*a*, 5*b*, 5*c*
axis 6
pin 7
slotted link 8
separation stop $8_1$, $8_2$,
evasive stop $8_3$
positioning lever 9
axis 10
path 11
path 12
center-zero spring 13
return spring 14

The invention claimed is:

1. A motor vehicle lock, comprising:
a locking mechanism including a rotary latch and a pawl,
an actuating lever chain configured to act upon the locking mechanism,
a coupling lever, and
a positioning lever including a pin and a slotted link,
wherein the coupling lever, in an engaged state, closes the actuating lever chain to act upon the locking mechanism and opens the locking mechanism in a disengaged state,
wherein the coupling lever engages the pin into the slotted link of the positioning lever,
wherein the slotted link is configured to guide the pin, in order to change between a first stable end position and a second stable end position, and
wherein the slotted link is a bidirectional slotted link in such a way that, when the coupling lever is acted upon, the pin reaches the first stable end position along a first path and, after the coupling lever has been acted upon again, the pin reaches the second stable end position along a second path which is separate from the first path,
wherein the first path extends from the second stable end position to the first stable end position and the second path extends from the first stable end position to the second stable end position, and
wherein the first path and the second path are spatially and functionally separated from one another.

2. The motor vehicle lock according to claim 1, wherein the bidirectional slotted link has at least one separation stop separating the first path from the second path.

3. The motor vehicle lock according to claim 2, wherein, the bidirectional slotted link further has an evasive stop.

4. The motor vehicle lock according to claim 2, wherein the bidirectional slotted link includes two separation stops and an evasive stop.

5. The motor vehicle lock according to claim 1, wherein the positioning lever further includes a center-zero spring.

6. The motor vehicle lock according to claim 5, wherein the positioning lever further includes a bearing pin, and wherein the center-zero spring is a leg spring enclosing on the bearing pin.

7. The motor vehicle lock according to claim 1, wherein the coupling lever includes at least two arms comprising a pin arm carrying the pin, and a coupling arm.

8. The motor vehicle lock according to claim 7, wherein the coupling lever further includes an actuating arm.

9. The motor vehicle lock according to claim 6, wherein the leg spring includes a winding portion having two legs extending therefrom.

10. The motor vehicle lock according to claim 1, wherein the coupling lever has a return spring.

11. The motor vehicle lock according to claim 10, wherein the return spring is configured to act upon the coupling lever.

12. The motor vehicle lock according to claim 7, wherein the coupling arm and the pin arm are mounted rotatably about a common axis.

13. The motor vehicle lock according to claim 8, wherein the coupling arm, the pin arm, and the actuating arm are at an angular distance from one another.

14. The motor vehicle lock according to claim, 8 further comprising an electromotive drive, wherein the coupling arm is configured to actuate the coupling lever by the electromotive drive.

15. The motor vehicle lock according to claim 1, wherein the positioning lever is triangular, wherein the first path extends along a first portion of the positioning lever and the second path extends along a second portion of the positioning lever.

* * * * *